United States Patent

(12) United States Patent
Su et al.

(10) Patent No.: US 9,568,951 B2
(45) Date of Patent: Feb. 14, 2017

(54) ELECTRONIC DEVICE

(71) Applicant: Acer Incorporated, New Taipei (TW)

(72) Inventors: Iou-Ren Su, New Taipei (TW);
Shun-Bin Chen, New Taipei (TW)

(73) Assignee: ACER INCORPORATED, New Taipei (TW)

(*) Notice: Subject to any disclaimer, the term of this patent is extended or adjusted under 35 U.S.C. 154(b) by 0 days.

(21) Appl. No.: 14/755,276

(22) Filed: Jun. 30, 2015

(65) Prior Publication Data
US 2016/0209873 A1 Jul. 21, 2016

(30) Foreign Application Priority Data

Jan. 20, 2015 (TW) .............................. 104101752 A

(51) Int. Cl.
G06F 1/16 (2006.01)
(52) U.S. Cl.
CPC ........... G06F 1/1637 (2013.01); G06F 1/1613 (2013.01); G06F 1/1656 (2013.01)
(58) Field of Classification Search
CPC combination set(s) only.
See application file for complete search history.

(56) References Cited

U.S. PATENT DOCUMENTS

| 5,107,402 A | * | 4/1992 | Malgouires | F16C 11/103 16/307 |
| 5,157,585 A | * | 10/1992 | Myers | F16M 11/10 361/679.17 |
| 5,175,672 A | * | 12/1992 | Conner | G06F 1/1616 235/145 R |
| 5,229,757 A | * | 7/1993 | Takamiya | F16M 11/10 235/145 R |
| 5,247,285 A | * | 9/1993 | Yokota | E05C 1/10 248/919 |
| 5,375,076 A | * | 12/1994 | Goodrich | G06F 1/1626 361/679.17 |
| 6,480,373 B1 | * | 11/2002 | Landry | G06F 1/1616 16/308 |
| 6,728,100 B2 | * | 4/2004 | Cheng-Hsing | G06F 1/1616 361/679.27 |
| 6,732,735 B1 | * | 5/2004 | Snell | A61L 15/42 128/844 |

(Continued)

FOREIGN PATENT DOCUMENTS

TW 432274 5/2001
TW M455900 6/2013

(Continued)

OTHER PUBLICATIONS

Chinese language office action dated Jan. 28, 2016, issued in application No. TW 104101752.

Primary Examiner — Lisa Lea Edmonds
(74) Attorney, Agent, or Firm — McClure, Qualey & Rodack, LLP

(57) ABSTRACT

An electronic device is provided, including a main body, a display unit connected to the main body, and an input unit detachably connected to the main body. The input unit has a pad protruding from the bottom side thereof. When the input unit is placed on a surface of an object, the pad contacts the surface. When the main body is placed on the surface and joined with the input unit, the pad and the surface form a distance therebetween.

10 Claims, 5 Drawing Sheets

(56) References Cited

U.S. PATENT DOCUMENTS

| | | | | |
|---|---|---|---|---|
| 6,781,823 B1* | 8/2004 | Nyack | ............... | G06F 1/1601 346/145 |
| 6,870,732 B2* | 3/2005 | Huang | ............... | G06F 1/1626 220/230 |
| 7,599,178 B2* | 10/2009 | Huang | ............... | G06F 1/1632 361/679.28 |
| 7,898,802 B2* | 3/2011 | Lian | ............... | G06F 1/1616 108/50.01 |
| 8,154,860 B2* | 4/2012 | Chen | ............... | F16M 13/00 135/66 |
| 8,199,498 B2* | 6/2012 | Wang | ............... | G06F 1/1656 248/638 |
| 8,238,085 B2* | 8/2012 | Wu | ............... | G06F 1/1616 312/223.1 |
| 8,264,839 B2* | 9/2012 | Shen | ............... | H05K 5/0204 248/188.8 |
| 8,537,546 B2* | 9/2013 | Shih | ............... | H05K 5/0234 361/679.59 |
| 8,934,232 B2* | 1/2015 | Hsu | ............... | G06F 1/1626 248/919 |
| 8,941,990 B2* | 1/2015 | Uttermann | ............... | H05K 5/0234 248/188.8 |
| 9,027,747 B2* | 5/2015 | Hsu | ............... | G06F 1/1626 206/45.2 |
| 9,253,379 B2 | 2/2016 | Lam et al. | | |
| 9,256,259 B2 | 2/2016 | Lin | | |
| 2004/0012509 A1* | 1/2004 | Chen | ............... | G06F 1/1616 341/22 |
| 2011/0222233 A1* | 9/2011 | Lu | ............... | G06F 1/1616 361/679.21 |
| 2013/0279096 A1* | 10/2013 | Gengler | ............... | H05K 7/00 361/679.01 |
| 2014/0152571 A1 | 6/2014 | Ishikawa | | |

FOREIGN PATENT DOCUMENTS

| | | |
|---|---|---|
| TW | 201433906 | 9/2014 |
| TW | 201439726 | 10/2014 |

* cited by examiner

ELECTRONIC DEVICE

CROSS REFERENCE TO RELATED APPLICATIONS

This application claims priority of Taiwan Patent Application No. 104101752, field on Jan. 20, 2015, the entirety of which is incorporated by reference herein.

BACKGROUND OF THE INVENTION

Field of the Invention

Aspects of the present invention relate generally to electronic devices, and more particularly, to electronic devices having a detachable input unit.

Description of the Related Art

Conventional laptop computers are usually provided with an undetachable keyboard. Additionally, when using conventional tablet computers, users can only operate or click through the touch screen, but cannot apply external keyboards or touchpads to the tablet computers for data input. It is unfortunate that neither the laptop computers nor the tablet computers provide a flexible and convenient way for the users to operate them.

BRIEF SUMMARY OF THE INVENTION

In one exemplary embodiment, an electronic device is provided in the invention. The electronic device includes a main body, a display unit connected to the main body, and an input unit detachably connected to the main body. The input unit has a pad protruding from the bottom thereof. When the input unit is placed on the surface of an object, the pad contacts the surface. When the main body is placed on the surface and joined with the input unit, the pad and the surface form a distance therebetween.

In one exemplary embodiment, the input unit further has a support protruding from the bottom thereof, and when the input unit is placed on the surface, the support and the pad contact the surface.

In one exemplary embodiment, when the input unit is joined with the main body, the pad is distant from the main body by a first distance, and the support is distant from the main body by a second distance, wherein the first distance is less than the second distance.

In one exemplary embodiment, the support has a first protruding length, the pad has a second protruding length, and the first protruding length exceeds the second protruding length.

In one exemplary embodiment, the main body has at least a protrusion at the bottom thereof, and when the main body is placed on the surface of the object, the protrusion contacts the surface.

In one exemplary embodiment, the pad has a second protruding length, the protrusion has a third protruding length, and the third protruding length exceeds the second protruding length.

In one exemplary embodiment, the main body has a recess, and the input unit has a protruding portion joined to the recess when the input unit connects to the main body.

In one exemplary embodiment, the main body has a first magnetic element, the input unit has a second magnetic element, and the protruding portion is joined to the recess by magnetically attractive positioning between the first and second magnetic elements.

In one exemplary embodiment, the display unit is pivotally connected with the main body.

In one exemplary embodiment, the pad has a low-friction coating.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

While the invention has been described in connection with various aspects, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting.

Figure 1A:
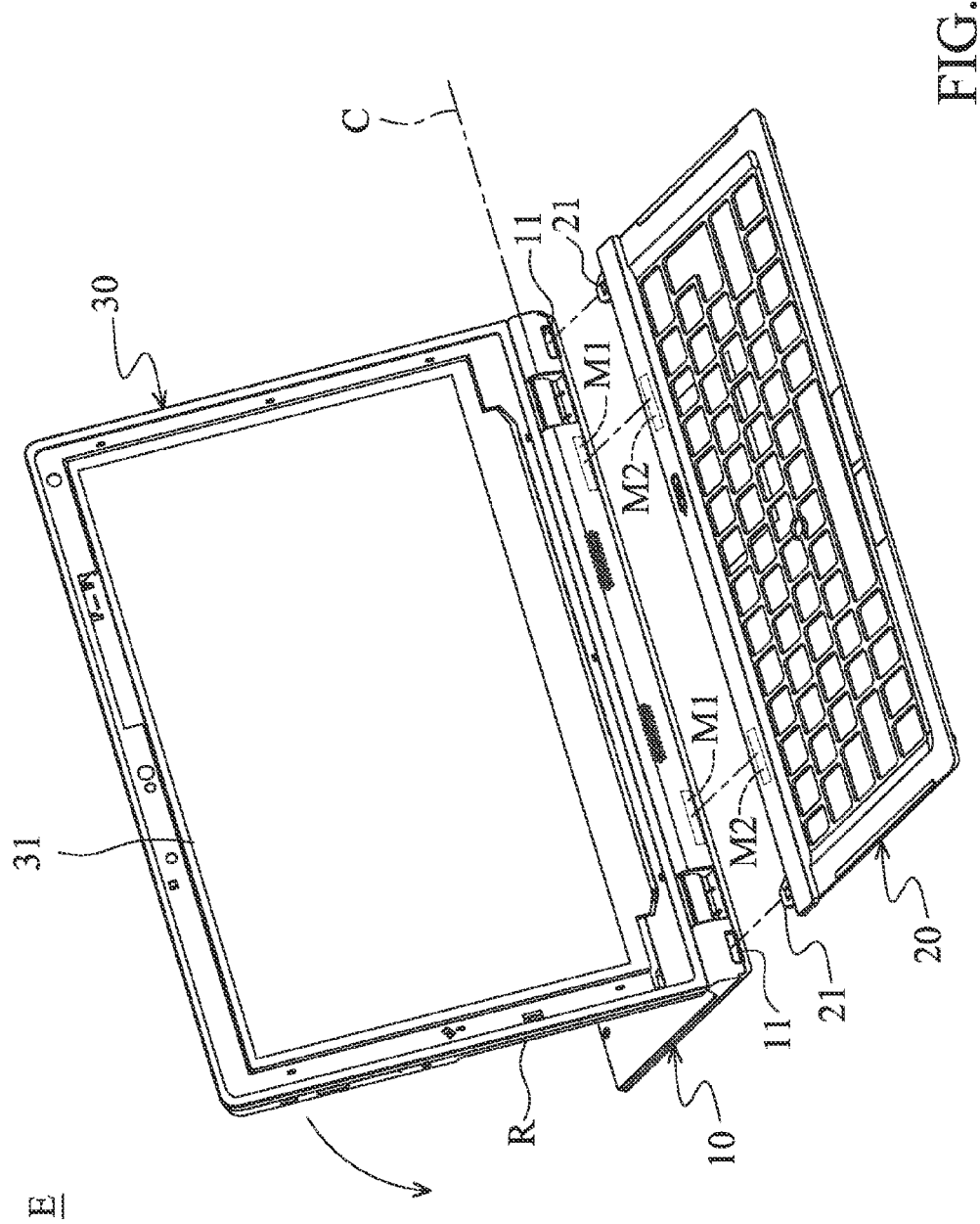
FIG. 1A shows an electronic device according to one embodiment of the invention.

Referring to FIG. 1A, an embodiment of an electronic device can be selectively used as a tablet computer/touch control computer or a laptop computer. The electronic device primarily comprises a main body 10 an input unit 20, and a display unit 30. In this embodiment, the main body 10 is pivotally connected to the display unit 30, wherein a CPU and a main board is disposed in the main body 10. A keyboard or touchpad may be disposed on the surface of the input unit 20, and the input unit 20 is connected with the main body 10 in a detachable manner.

In an exemplary embodiment, if the users would like to use the electronic device as a tablet computer/touch control computer, the input unit 20 can be detached from the main body 10. Alternatively, if the users would like to use the electronic device as a laptop computer, the input unit 20 can be joined to the main body 10 for convenient usage. In this embodiment, the display unit 30 has a flat touch control display and electrically connects to the main body 10, wherein the display unit 30 is rotatable around a rotation axis C with respect to the main body 10.

It should be noted that when the input unit 20 is detached from the main body 10, as shown in FIG. 1A, the display unit 30 and the main body 10 may have an inclined angle therebetween, so that users can conveniently see the screen 31 on the display unit 30 and directly input data or click through the screen 31. Additionally, the display unit 30 can be folded to the main body 10 by a user rotating the display unit 30 relative to the main body 10 toward the rear side thereof around the rotation axis C, as the arrow indicates in FIG. 1A. Thus, the main body 10 and the input unit 20 can form a tablet structure, as a tablet computer, for users to input data directly or click through the screen 31.

Figure 1B:
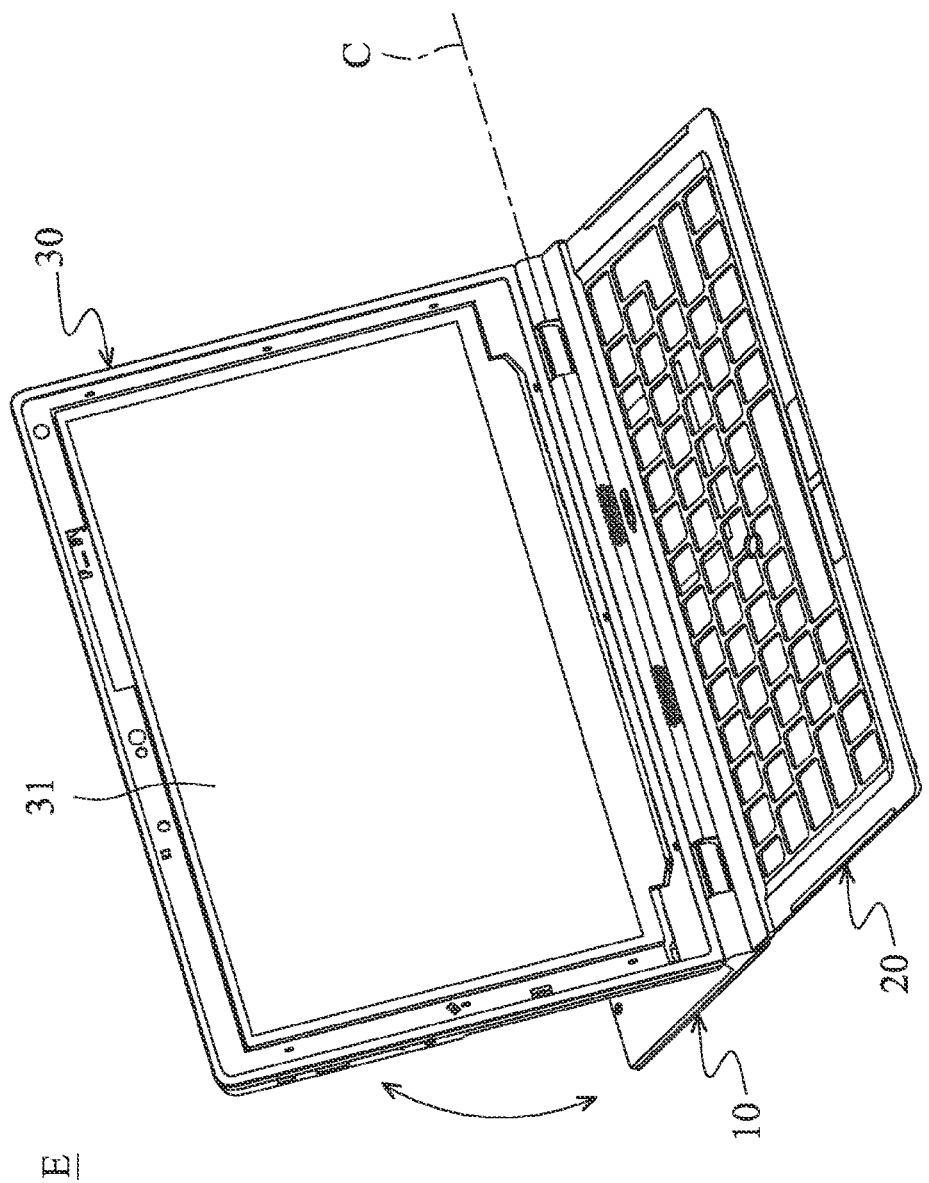
FIG. 1B shows the electronic device of FIG. 1A when the input unit is joined with the main body according to one embodiment of the invention.

Moreover, if a user would like to incorporate the main body 10, the input unit 20, and the display unit 30 as a laptop computer, the input unit 20 can be joined to the main body 10 as shown in FIG. 1B. Here, the display unit 30 can be rotated around the rotation axis C and adjusted to an appropriate angle with respect to the main body 10, as indicated by the arrow in FIG. 1B. This way, the user can input data or click through the keyboard or touchpad on the input unit 20 to facilitate flexible and convenient usage.

In FIG. 1A, the main body 10 in this embodiment has at least a recess 11, and the input unit 20 has at least a protruding portion 21 corresponding to the recess 11. When the input unit 20 is assembled to the main body 10, the protruding portion 21 is joined in the recess 11, such that the input unit 20 and the main body 10 are firmly secured to each other. Furthermore, to achieve rapid connection between the input unit 20 and the main body 10, the main body 10 has a first magnetic element M1 therein, and the input unit 20 has a second magnetic element M2 therein. When the input unit 20 is close to the main body 10, they can be mutually aligned and positioned by magnetic attraction between the first and second magnetic elements M1 and M2. Thus, the protruding portion 21 can be rapidly joined to the recess to improve the efficiency of assembly.

Figure 2A:
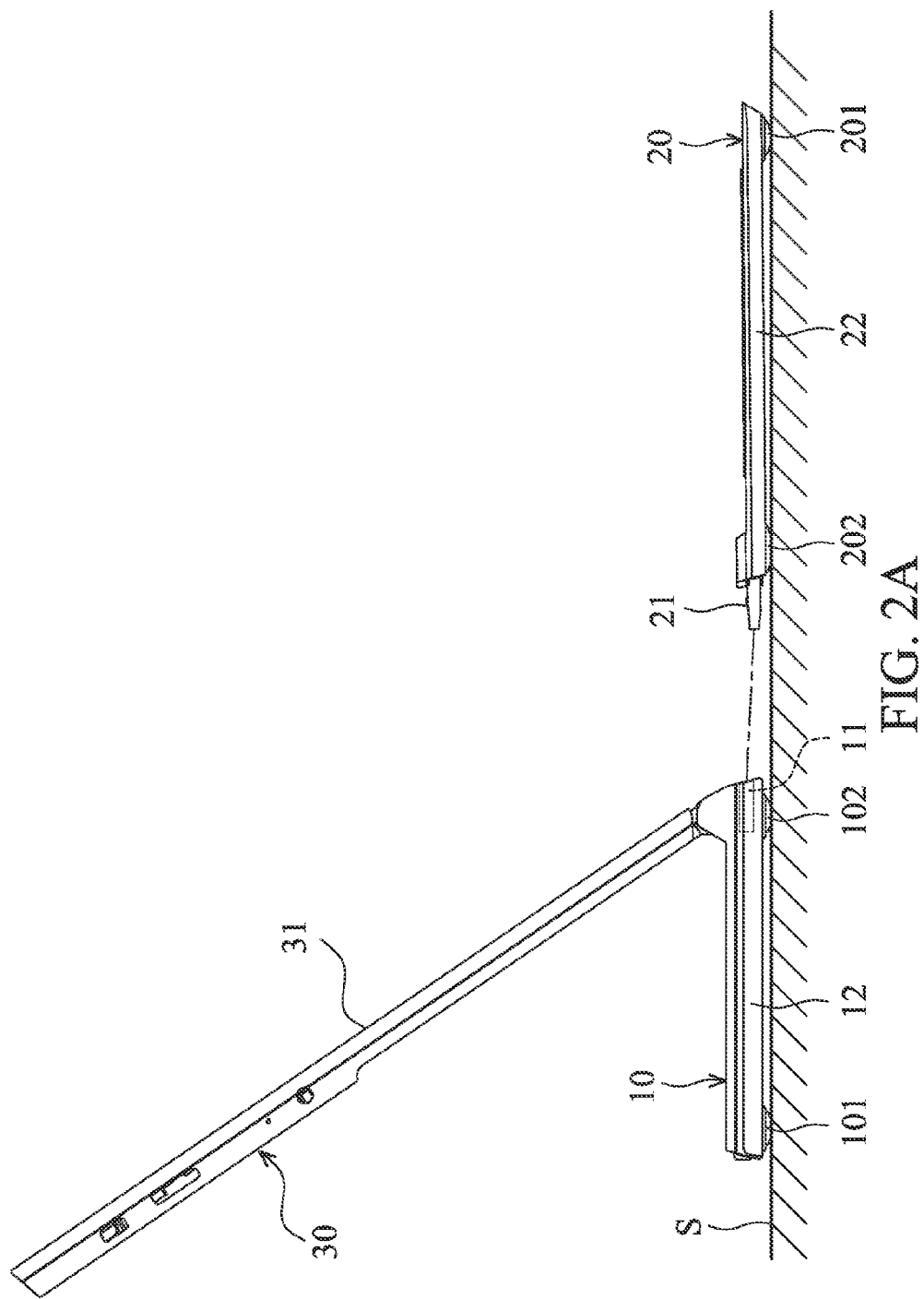
FIG. 2A is a side view of an electronic device when the input unit is detached from the main body according to one embodiment of the invention.

Referring to FIG. 2A, the main body 10 has two protrusions 101 and 102. When the main body 10 is placed on a surface S of an object (such as a table), protrusions 101 and 102 contact the surface S, such that the main body 10 can be prevented from sliding due to the friction between the surface S and the protrusions 101 and 102.

The input unit 20 has a support 201 and a pad 202 on the bottom side thereof. When the input unit 20 is detached from the main body 10 and placed on the surface S, as shown in FIG. 2A, the support 201 and the pad 202 contact the surface S to stably support the input unit 20. It should be noted that the protruding lengths of the support 201 and the pad 202 are different. When the input unit 20 is joined with the main body 10, the pad 202 is suspended and spaced apart from the surface S. The detailed configuration will be described below.

Figure 2B:
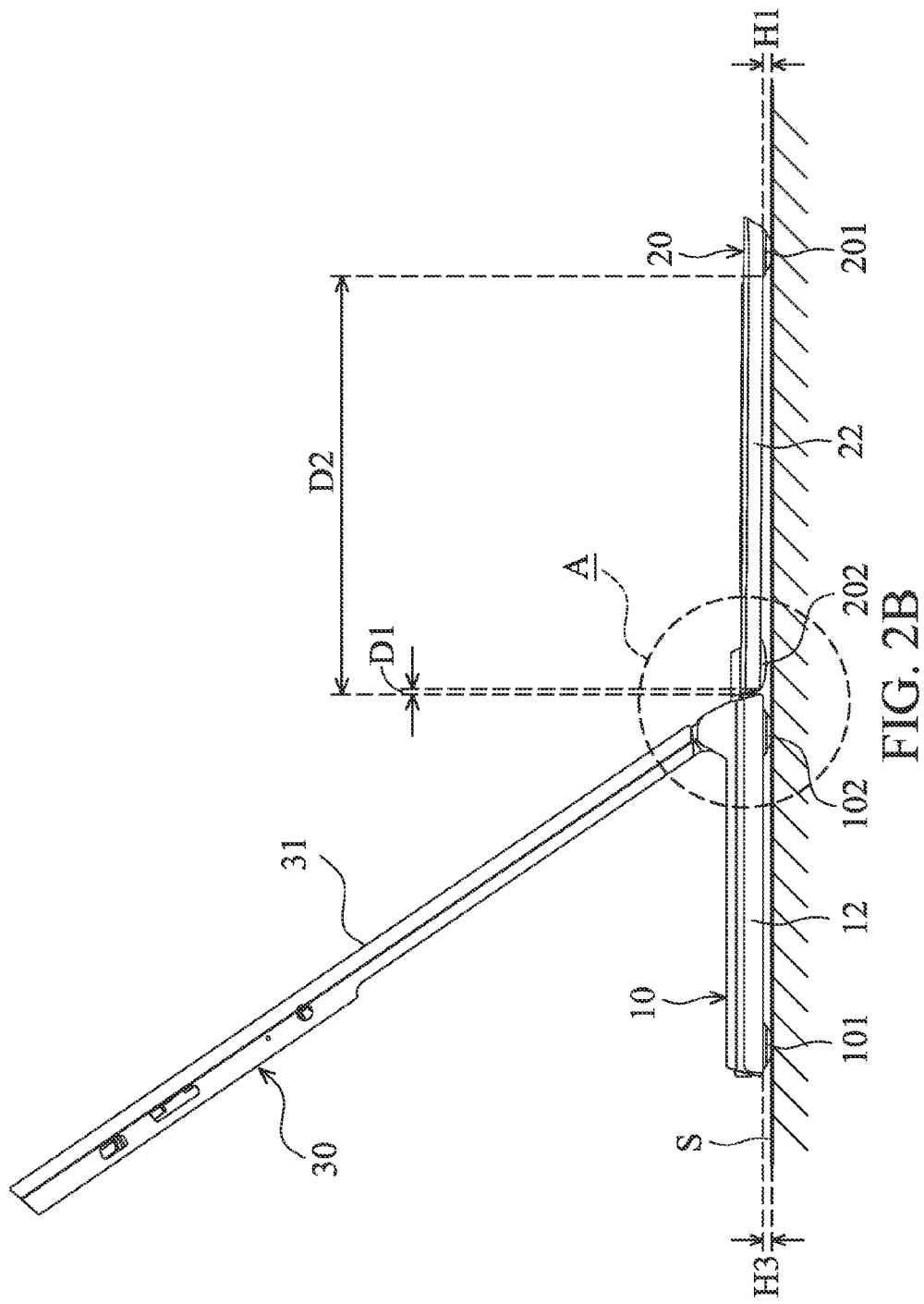
FIG. 2B is a side view of an electronic device when the input unit is joined with the main body according to one embodiment of the invention.
Figure 3:
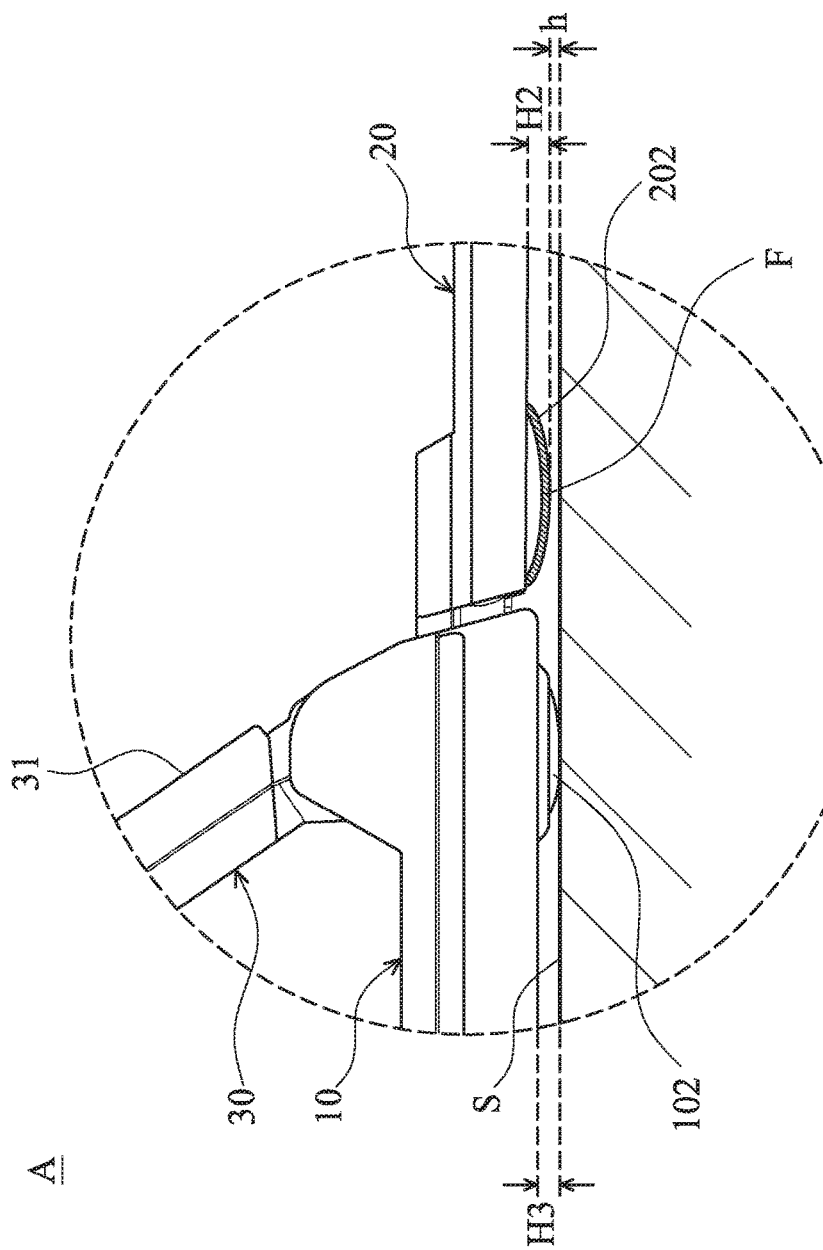
FIG. 3 is an enlarged view of the portion A in FIG. 2B according to one embodiment of the invention.

Referring to FIGS. 2B and 3, FIG. 3 is an enlarged view of the portion A in FIG. 2B. When the input unit 20 is joined with the main body 10, as in the state shown in FIG. 2B, the pad 202 of the input unit 20 is distant from the main body 10 by a first distance D1, and the support 201 is distant from the main body 10 by a second distance D2. In FIGS. 2B and 3, the support 201 on the bottom side of the input unit 20 has a first protruding length H1, and the pad 202 on the bottom side of the input unit 20 has a second protruding length H2, wherein the first protruding length H1 exceeds the second protruding length H2. Moreover, the protrusions 101 and 102 on the bottom side of the main body 10 have a third protruding length H3 which substantially equals the first protruding length H1 and exceeds the second protruding length H2.

FIG. 3 illustrates the protruding portion 21 on the lateral side of the input unit 20 when joined and fixed to the recess 11 on the main body 10, such that the pad 202 that is shorter than the support 201 is lifted and spaced apart from the surface S by a distance h, so as to reduce the friction between the surface S (such as a table) and the pad 202 of the input unit 20. Since interference of the friction between the surface S and the pad 202 is absent, assembly between the main body 10 and the input unit 20 can be much easier for users. Additionally, rapid positioning and connection between the first and second magnetic elements M1 and M2 can also be achieved, thereby reducing the assembly time and improving the efficiency of usage. In some embodiments, the support 201, the pad 202, and the protrusions 101 and 102 may have a low-friction coating, e.g. Polytetrafluoroethene, PTFE, as the coating F shows in FIG. 3, so as to reduce friction when in contact with the surface S.

In summary, the invention provides an electronic device, wherein a pad is disposed on the bottom side of the input unit. Thus, when the input unit is separated from the main body, the pad can contact an object surface (such as a table) for supporting the input unit. Additionally, when the input unit is joined with the main body, the pad is suspended and spaced apart from the surface by a distance, such that the friction between the pad and the object surface can be reduced. Hence, easy assembly of the electronic device can be achieved without interference of friction, so as to facilitate convenient usage.

While the invention has been described by way of example and in terms of preferred embodiment, it is to be understood that the invention is not limited thereto. On the contrary, it is intended to cover various modifications and similar arrangements (as would be apparent to those skilled in the art). Therefore, the scope of the appended claims should be accorded the broadest interpretation to encompass all such modifications and similar arrangements.

What is claimed is:

1. An electronic device, comprising:
    a main body;
    a display unit, connected to the main body; and
    an input unit, detachably connected to the main body, having a pad protruding from a bottom side of the input unit, wherein when the input unit is placed on a surface of an object, the pad contacts the surface, and when the main body is placed on the surface and joined with the input unit, the pad and the surface form a gap therebetween.

2. The electronic device as claimed in claim 1, wherein the input unit further has a support protruding from the bottom side of the input unit, and when the input unit is placed on the surface, the support and the pad contact the surface.

3. The electronic device as claimed in claim 2, wherein when the input unit is joined with the main body, the pad is distant from the main body by a first gap, and the support is distant from the main body by a second gap, wherein the first gap is less than the second gap.

4. The electronic device as claimed in claim 2, wherein the support has a first protruding length, the pad has a second protruding length, and the first protruding length exceeds the second protruding length.

5. The electronic device as claimed in claim 1, wherein the main body has at least a protrusion on a bottom surface thereof, and when the main body is placed on the surface of the object, the protrusion contacts the surface.

6. The electronic device as claimed in claim 5, wherein the pad has a second protruding length, the protrusion has a third protruding length, and the third protruding length exceeds the second protruding length.

7. The electronic device as claimed in claim 1, wherein the main body has a recess, and the input unit further has a protruding portion joined to the recess when the input unit connects with the main body.

8. The electronic device as claimed in claim 7, wherein the main body has a first magnetic element, the input unit further has a second magnetic element, and the protruding portion is joined to the recess by magnetically attractive positioning between the first and second magnetic elements.

9. The electronic device as claimed in claim 1, wherein the display unit is pivotally connected with the main body.

10. The electronic device as claimed in claim 1, wherein the pad has a low-friction coating.

* * * * *